United States Patent Office 3,134,854
Patented May 26, 1964

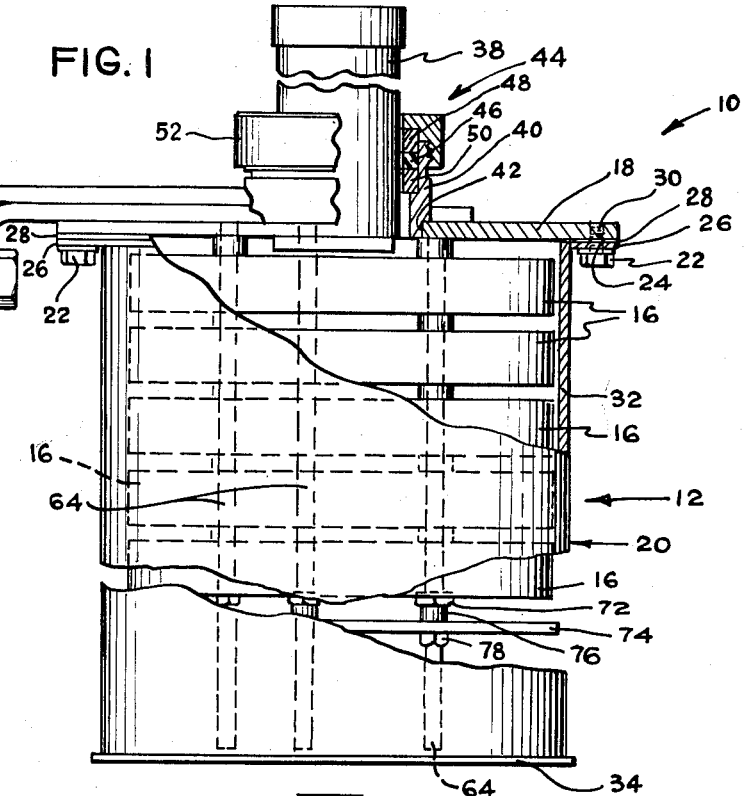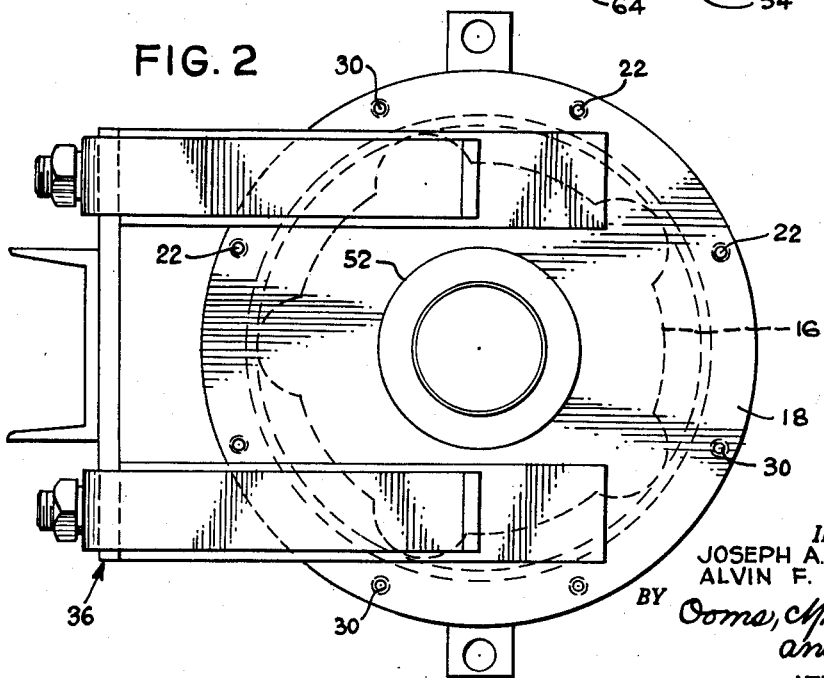

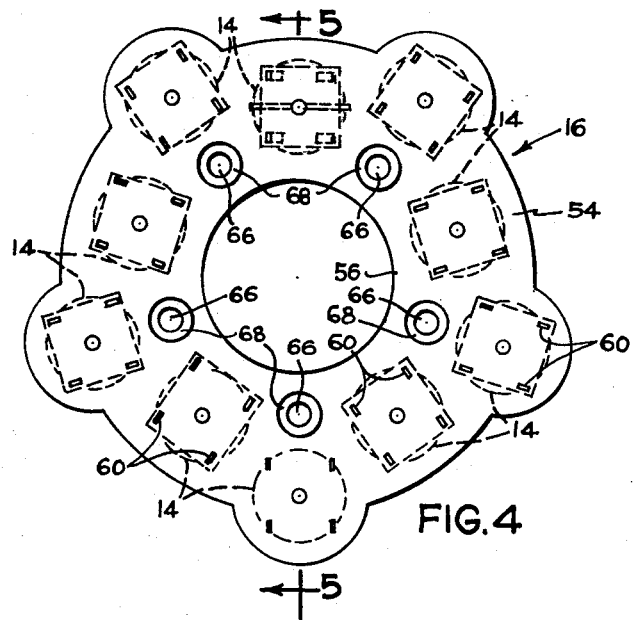
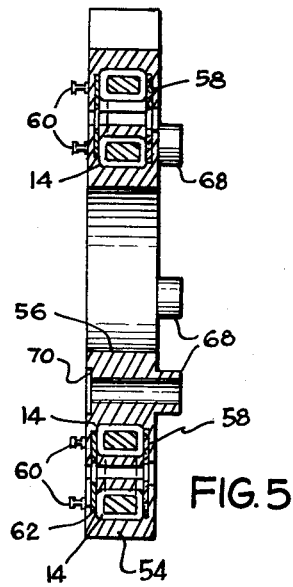
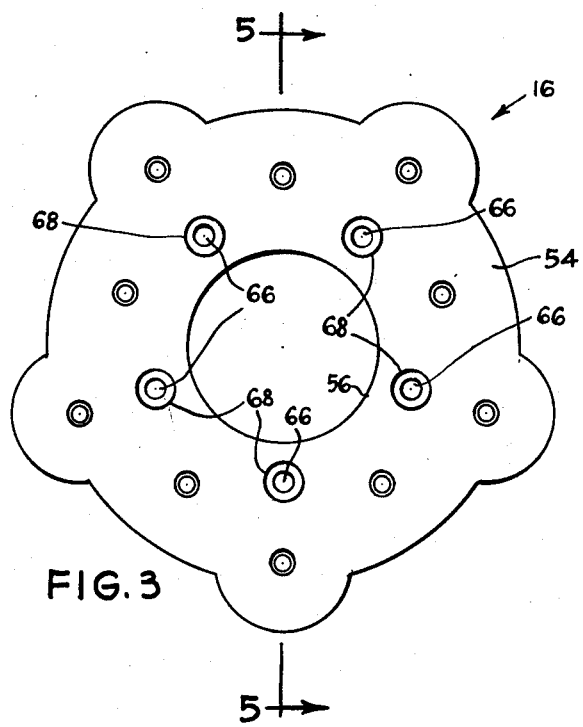
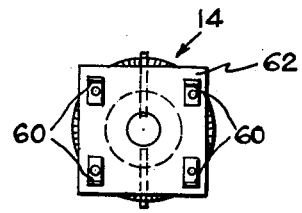
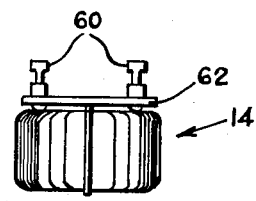

3,134,854
LOADING COIL UNIT
Joseph A. Martin, Jr., Norridge, and Alvin F. Paddock, Deerfield, Ill., assignors to Cook Electric Company, Chicago, Ill., a corporation of Delaware
Filed Aug. 15, 1961, Ser. No. 131,979
5 Claims. (Cl. 178—46)

This invention relates to loading coil units of the type commonly used for loading telephone lines or other wire circuits.

One object of the present invention is to provide a new and improved loading coil unit which may initially be supplied by the factory with a desired number of loading coils, and which may be provided later with additional loading coils, after a period of use in the field.

A further object is to provide a new and improved loading coil unit in which the loading coils are grouped in separate blocks or modules, a maximum number of which may be mounted in the unit, and in which any desired number of blocks, less than the maximum number, may be mounted in the unit as shipped initially from the factory, so that additional blocks of loading coils may be added later in the field, as needed.

Another object is to provide a loading coil unit of the foregoing character having a sealed casing which may be opened in the field to provide for the installation of additional loading coils.

A further object is to provide a new and improved loading coil unit which may be low in initial cost, because the purchaser is not compelled to buy the maximum complement of loading coils, but rather may buy the loading coil unit with only the desired number of coils, and may install additional coils later in the field, as needed.

Further objects and advantages of the present invention will appear from the following description, taken with the accompanying drawings, in which:

FIG. 1 is an elevational view of the loading coil unit to be described as an illustrative embodiment of the present invention, portions of the unit being broken away and shown in section.

FIG. 2 is a top view of the loading coil unit of FIG. 1.

FIG. 3 is a top view of a block or module containing a group of loading coils, several of the blocks being employed in the unit of FIG. 1.

FIG. 4 is a bottom view of the block or module of FIG. 3.

FIG. 5 is a sectional view, taken generally along the line 5—5 in FIG. 3.

FIG. 6 is a plan view of one of the loading coils employed in the block or module of FIG. 3.

FIG. 7 is an elevational view of the loading coil of FIG. 6.

As already indicated, FIGS. 1 and 2 illustrate a loading coil unit 10 which may be employed in a telephone system, or any other wire communication service, for loading telephone lines or the like. Unit 10 comprises a casing 12 which contains a plurality of loading coils 14 arranged in one or more blocks or modules 16. In this case, each block 16 comprises a group of 10 loading coils, as will be evident from FIG. 3. However, it will be realized that any suitable or convenient number of loading coils may be incorporated in each of the blocks or modules 16.

As illustrated, the casing 12 comprises a circular upper wall or mounting plate 18 and a cylindrical can 20 which may be removed from the plate 18. A plurality of screws 22 are provided to secure the can 20 to the plate 18. The screws 22 extend through holes 24 in a flange 26 which is welded or otherwise secured to the upper end of the cylindrical can 20. In order to seal the casing 12, a suitable gasket 28 is interposed between the flange 26 and the mounting plate 18. The screws 22 may be threaded into tapped openings 30 in the mounting plate 18. The can 20 has a cylindrical side wall 32 which is closed at its lower end by a circular bottom wall 34 which is welded or otherwise permanently secured to the side wall 32.

The loading coil unit 10 may be mounted on a telephone pole or any other suitable support by means of a bracket 36. In this case, the bracket is welded or otherwise secured to the mounting plate 18.

A cable 38 extends into the casing 12 to make electrical connections to the loading coils 14. As shown, the cable 38 extends through a bushing 40 which is mounted in an opening 42 in the mounting plate 18. The bushing 40 is provided with a compression type sealing arrangement 44 whereby the cable is hermetically sealed in the bushing. As shown, the sealing arrangement comprises a soft, resilient sealing ring 46, made of rubber, synthetic rubber or the like, adapted to be compressed between a pair of rings 48 and 50, which may be made of metal or the like. The ring 48 is compressed downwardly by tightening an annular nut 52 which is threaded onto the bushing 40. Any other suitable sealing arrangement may be provided. It will be understood that the cable 38 may be spliced in the field to the telephone cable containing the circuits to be connected to the loading coils.

It will be seen from FIGS. 3-5 that each of the blocks or modules 16 comprises a body or mass 54 in which the loading coils 14 are embedded. The body 54 is annular in shape and is provided with a central opening 56 through which the cable 38 may extend to make connections to the loading coils. The body 54 is preferably made of a suitable insulating plastic material which may be case or molded around the loading coils 14. As shown, the coils 14 are spaced around two concentric circles. Thus, the alternate coils are staggered inwardly and outwardly. This arrangement promotes the isolation of the individual coils. If desired, the body 54 may incorporate various ferrites or other magnetic materials which will concentrate the magnetic fields of the various loading coils and thus will promote a greater degree of isolation between the coils. In the illustrated construction, a disc or washer 58, made of iron or other magnetic material, is embodied in the body 54 adjacent each loading coil 14 to concentrate the magnetic field of the coil and thus isolate the coil from the other coils in the block. Each coil has two pairs of terminals 60 mounted on an insulating plate 62 at the opposite end of the coil. The terminals 60 project upwardly from the body 54 so that the wire may readily be soldered or otherwise connected to the terminals.

As shown to advantage in FIG. 1, the illustrated blocks or modules 16 are stacked within the casing 12 and are strung on supporting rods or pins 64 which extend downwardly from the mounting plate 18. The rods 64 may be tapped into the mounting plate 18 or may be welded or otherwise secured thereto. Openings 66 are formed in the body 54 of each module 16, to receive the mounting rods 64. In this case, five of the rods 64 are employed. To maintain spacing between the modules 16, a boss or projection 68 is formed around the upper end of each opening 66. A slight depression or recess 70 is formed around the lower end of each opening. The bosses 68 are adapted to be received and located in the recesses 70 formed in the adjacent module.

Nuts 72 may be mounted on the rods 64 to support the lower end of the stack of modules or blocks 16. The rods 64 may be threaded to receive the nuts 72. A cover plate 74 may be mounted on the rods 64 below the nuts 72 and may be separated therefrom by spacers 76. A second set of nuts 78 may be employed to retain the plate 74.

The can 20 may be made large enough to hold a certain maximum number of the modules 16. However, any desired number of modules, less than the maximum number, may be mounted initially in the can by the manufacturer, to suit the requirements of the purchaser. In this way, the purchaser is not required to buy loading coils which are not needed to meet current requirements. At a later date, the purchaser may buy additional loading coil modules which may be installed in the loading coil unit in the field. This is done by removing the can 20 and adding the new modules to the stack of modules within the casing 12. The can 20 may easily be removed by removing the screws 22. The nuts 72 and 78 may then be removed so that the new modules may be strung onto the mounting rods 64. The nuts may then be replaced. Sufficient conductors may be provided in the cable 38, as initially supplied, to establish electrical connections to the maximum number of loading coils that may be mounted in the casing 12. Extra conductors will thus be available to be connected to the new loading coil modules in the field.

Each of the loading coils 14 is individually sealed by the embedding material of the body 54. In addition, the gasket 28 provides a tight seal so that moisture will be excluded from the casing 12. Thus, the loading coil unit will not be affected by the weather and will give dependable service.

Various modifications, alternative constructions and equivalents may be employed without departing from the true spirit and scope of the invention, as exemplified in the foregoing description and defined in the following claims.

We claim:

1. In a loading coil unit, the combination comprising a mounting plate, a plurality of rods extending from one side of said mounting plate, a plurality of loading coil modules mounted on said rods, a housing received around said modules and said rods, a plurality of fasteners disengageably securing said housing to said mounting plate, a gasket interposed between said housing and said mounting plate, said housing being removable for the addition of new modules to said unit, a cable extending into said housing through said mounting plate, and means forming a seal between said cable and said mounting plate, each of said modules comprising a ring shaped body made of insulating material and having openings therein for receiving said rods, and a plurality of loading coils embedded in said body.

2. In a loading coil unit, the combination comprising a mounting plate, a cable extending axially through said plate, means forming a seal between said cable and said plate, a plurality of rods extending from one side of said plate, a plurality of loading coil modules mounted on said rods, a housing received around said modules, a plurality of removable fasteners for securing said housing to said plate, and a gasket interposed between said housing and said plate, each of said modules comprising a ring shaped body having a central opening for receiving said cable, said body having a plurality of openings for receiving said rods, a plurality of loading coils embedded in said body, said body being made of insulating material, and a magnetic member embedded in said body adjacent each of said coils for localizing the magnetic flux therefrom and thereby isolating the coils, said body of each of said modules having bosses formed thereon around said openings for maintaining said modules in spaced relation, said housing being removable for the installation of additional loading coil modules therein.

3. In a loading coil unit, the combination comprising a mounting plate, a plurality of rods extending from one side of said plate, a plurality of loading coil modules mounted on said rods, a housing received around said modules, a plurality of removable fasteners for securing said housing to said plate, and a gasket interposed between said housing and said plate, each of said modules comprising a body having a plurality of openings for receiving said rods, a plurality of loading coils embedded in said body, said body being made of insulating material, and a magnetic member embedded in said body adjacent each of said coils for localizing the magnetic flux therefrom and thereby isolating the coils, said housing being removable for the installation of additional loading coil modules therein.

4. A loading coil unit comprising mounting means, a plurality of rod means extending from one side of said mounting means, a plurality of unitary loading coil modules removably mounted on said rods, a housing surrounding said rods and said modules and releasably secured to said mounting means, each of said modules comprising a generally flat, ring-like body having openings therethrough for slidably receiving said rods, and a spaced series of loading coils embedded in the flat ring-like body of each of said modules.

5. The loading coil unit of claim 4 further characterized by and including means associated with each of said flat ring-like bodies for maintaining a predetermined spacing between said bodies.

References Cited in the file of this patent

UNITED STATES PATENTS

| 1,668,710 | Doring et al. | May 8, 1928 |

FOREIGN PATENTS

| 357,209 | Great Britain | Sept. 14, 1931 |
| 1,023,501 | Germany | Jan. 30, 1958 |